United States Patent Office 3,360,594
Patented Dec. 26, 1967

3,360,594
CASTABLE GUNNING MIX
George H. Criss, Bethel Park, Pa., assignor to Harbison-Walker Refractories Company, a division of Dresser Industries Inc., Pittsburgh, Pa.
No Drawing. Filed Jan. 10, 1966, Ser. No. 519,474
5 Claims. (Cl. 264—30)

ABSTRACT OF THE DISCLOSURE

The present invention relates to improvements in refractory gunning mixtures which consist of a calcined nonplastic refractory aggregate and a plasticizing material. The improvement consists of the addition of about 20 to 40%, by weight, of a cementitious material, such as Portland and/or calcium aluminate cement, and from about 1 to 5%, by weight, of fibrous asbestos. The gunning mixture is suitably sized within carefully controlled size gradations.

---

Various types of refractory materials are used in large tonnages for installing complete linings and maintaining existing linings by means of pneumatic emplacement. Basic refractory gunning mixes are supplied for maintaining open hearth and electric furnace walls and roofs and like environments coming in contact with chemically basic fumes and slags. Fireclay and high alumina gunning mixes are used in the maintenance of glass furnace linings and in the walls and arches of slab heating furnaces, soaking pits and similar environments in which neutral or acid refractories are required. This invention relates particularly to fireclay castable refractories.

One of the most distressing problems attendant the gunning of refractories is the high losses due to refractory material bouncing back off a wall or the situs upon which it is being emplaced. This loss is termed rebound in the art. Rebound loss has been as high as 40 and 50%. Use of plasticizers, in relatively small amounts, has reduced the rebound loss to on the order of 20%. However, 20% loss is still too high to be entirely satisfactory. Also, such plasticizer materials undesirably lower the refractoriness of the refractory gunning mixes to which they are added. Accordingly, it is among the objects of the present invention to provide an improved refractory composition which is applied to furnace walls with the usual gunning apparatus without high rebound and which has good adherence to the wall and dries upon firing in place without developing a relatively high amount of cracks.

It is another object of the invention to provide improved methods of gunning refractory material, by maintaining rebound losses considerably below what was heretofore considered possible.

Other objects of the invention will, in part, become apparent hereinafter.

Briefly, according to the present invention, improved gunning with a minimum of rebounds can be accomplished as follows:

A relatively coarse grained calcined, nonplastic refractory clay is mixed with a cementitious material and a plastic clay of intermediate to fine particle sizing. To this refractory is added only a small amount, between about 1 and 5%, by weight, of fibrous asbestos, which is intimately admixed therewith. The composition defined above is fed to a gunning device and it is mixed with from about 7 to 9% of water and is applied to a furnace wall. Any of the well known type of spray guns may be employed for this purpose. It has been discovered that this small amount of asbestos fiber added to the refractory gunning mix reduces rebound losses to below 10%, as compared to identical mixes including plastic clays but no asbestos, which have rebound losses on the order of 20%.

The composition of the invention consists essentially of about 60 to 80%, by weight, of calcined, nonplastic refractory clay passing through a 4 mesh screen, about 20 to 40% of a refractory cementitious material, such as, Portland cement, calcium aluminate cement or both, about 3 to 8% of a plastic clay, preferably of a particle size passing through a 35 mesh screen, and from about 1 to 5% of fibrous asbestos material. Preferably, the asbestos is present in amounts between 1 and 3% to prevent an undesirable decrease in density.

The coarse refractory clay employed herein may be selected from any nonplastic calcined clay, such as, flint clay, kaolin, diaspore, nodular clays, of the particle sizes indicated, and others which have been hard burned and exhibit negligible shrinkage upon reheating or refiring. In a preferred embodiment, primarily for economical reasons, high duty fireclay brickbats are used.

One plastic clay which has been found to give good results in this composition is known as Reighley clay which is mined near Fulton, Missouri. This clay has a typical analysis of about 58.4% $SiO_2$, 34.1% $Al_2O_3$, 1.6% $TiO_2$, 2.5% $Fe_2O_3$ and the balance CaO, MgO and alkalies. It should be understood, however, that other plastic clays may be employed.

As a further binding ingredient, and to enable a fast early set, Portland cement, calcium aluminate cement or mixtures thereof are employed. Where Portland cement is employed, it is preferred to use a type III ASTM or what is known as high early strength Portland cement. As is well known in the art, such high early strength cement is characterized by extremely finely divided particle size, having a specific surface of over 3200 sq. cm. per gram. It is characterized by containing a predominant amount of tricalcium silicate. A typical chemical analysis of such a high early strength Portland cement is as follows: 21.3% $SiO_2$, 2.7% $Al_2O_3$, 5.1% $Fe_2O_3$, 65.9% CaO, 1.9% MgO, 2.3% $SO_3$ and the balance alkalies and ignition loss.

The calcium aluminate cement may be any suitable one, such as, the cements sold in commerce and referred to as Lumnite cement, Rolandschutte cement, etc. An exemplary chemical analysis of a usable calcium aluminate cement is as follows: 10% $SiO_2$, 42% $Al_2O_3$, 5% $Fe_2O_3$, 5% FeO, 37% CaO, 1% MgO and 0.2% $SO_3$.

Generally, asbestos types are named after their chief mineral constituent. Examples are crysotile, crocidolite and tremolite, stated as $H_4Mg_3Si_2O_9$, $NaFe(SiO_3)_2 \cdot FeSiO_3$ and $CaMg_3(SiO_3)_4$.

For short, the first of the group is referred to as an Mg-Si asbestos since oxides of these two metals are its principal ingredients. This is the type of asbestos preferably used in the present invention. The oxides MgO and $SiO_2$ as present in the Mg-Si asbestos fibers do not diminish the refractoriness of the gunning mixes, at least to an appreciable extent. Crocidolite asbestos, although a common article of trade, is predominantly iron oxide, silica, and sodium oxide, and is less refractory. Tremolite is similarly low in refractoriness.

It is interesting to note that fibrous inorganic material, such as asbestos has been suggested previously in relatively large amounts, i.e., 15 or 20 to 40%, by weight, in combination with hydraulic setting cements to obtain an insulating material which can be trowelled in place. Asbestos without discrimination regarding its chemical composition has, of course, long been used in combination with gypsum and the like to make wallboard, since the art has, generally, recognized asbestos as a low heat conducting, nonflammable filler having good insulating properties. Asbestos has, also, been mixed with various inorganic rubber-like binder materials and coloring agents to provide a fire resistant composition but without regard to any properties of refractoriness.

The following examples are illustrative of the teachings of the present invention. All parts and percentages are by weight. All chemical analysis are on the basis of an oxide analysis. All sizing is according to the Tyler standard sieve series and, of course, all sizing and chemical analysis should be considered but typical.

*Example I*

A plurality of mixes were fabricated consisting of 60% —4 mesh high duty fireclay bats, 35% calcium aluminate cement, and 5% of Reighley plastic clay. To one batch was added about 1% of asbestos shorts (about 1" maximum length) and to another batch was added about 2% of asbestos shorts. A third batch was unaltered. The mixes were predampened with about 3% water and were gunned on a test panel. The unaltered batch had a rebound loss of about 21% and after heating to 1500° F. had a linear change of about −0.3%. The batch containing 1% asbestos fibers had a rebound loss of about 7.5% and a linear change of about −0.2%. The batch containing 2% asbestos fibers had a rebound loss of about 9.5% and a linear change of about −0.1%.

*Example II*

Two mixes were made consisting of 75% of high duty fireclay brick bats, 20% of high early strength Portland (ASTM type III) cement and 5% of Reighley clay. To one of the mixes was added 1% of asbestos shorts. Both mixes, after predampening with about 3% water were gunned on a test panel. The asbestos free mix had a rebound loss of about 29% and a linear change after heating to about 1000° F. of −0.3% while the asbestos containing mix had a rebound loss of 17.5% with only a −0.1% linear change.

A typical screen sizing for the batches of the invention are as follows:

| Screen size (Tyler): | Percent |
|---|---|
| −6+10 | 10–25 |
| −10+28 | 20–30 |
| −28+65 | 10–20 |
| −65 | 35–45 |

Having thus described the invention in detail and with sufficient particularly as to enable those skilled in the art to practice it, what is desired to have protected by Letters Patent is set forth in the following claims.

I claim:
1. A method of gunning an unconsolidated refractory material on its situs of use, wtih a minimum of rebound, to form a refractory monolith which comprises preparing a refractory batch consisting essentially of from 60–80% of a −4 mesh nonplastic, calcined refractory clay, from 3–8% of plastic clay, from about 1–5% of fibrous asbestos and from about 20–40% of a cementitious material selected from the group consisting of Portland cement and calcium aluminate cement, mixing the refractory batch with an aqueous carrier fluid and forcefully impacting the mixture on the situs of use.

2. The method of claim 1 in which said calcined refractory clay is a size graded high duty fire clay brick bats.

3. The method of claim 1 in which the asbestos fibers are present in amounts between 1–3%, by weight, based upon the total weight of the mixture.

4. The method of claim 1 in which the refractory batch consists essentially of, by weight, about 60% size graded high duty fire clay bats, about 35% calcium aluminate cement, about 5% plastic clay and about 1%, based upon the total weight of the batch, of asbestos fibers.

5. The method of claim 1 in which the refractory batch consists essentially of about 75% size graded high duty fire clay brick gats, about 20% of Portland cement, about 5% of plastic clay and about 1%, based upon the total weight of the batch, of asbestos fibers.

References Cited

UNITED STATES PATENTS

| 3,181,959 | 5/1965 | Raine et al. | 106—64 |
| 3,201,501 | 8/1965 | Cook et al. | 264—30 |
| 3,226,240 | 12/1965 | Crowley | 106—64 |
| 3,229,970 | 1/1966 | Henry | 264—30 |

TOBIAS E. LEVOW, *Primary Examiner.*

JAMES E. POER, *Examiner.*